(No Model.)
A. M. CLEAVER.
ANIMAL TRAP.
No. 376,142. Patented Jan. 10, 1888.
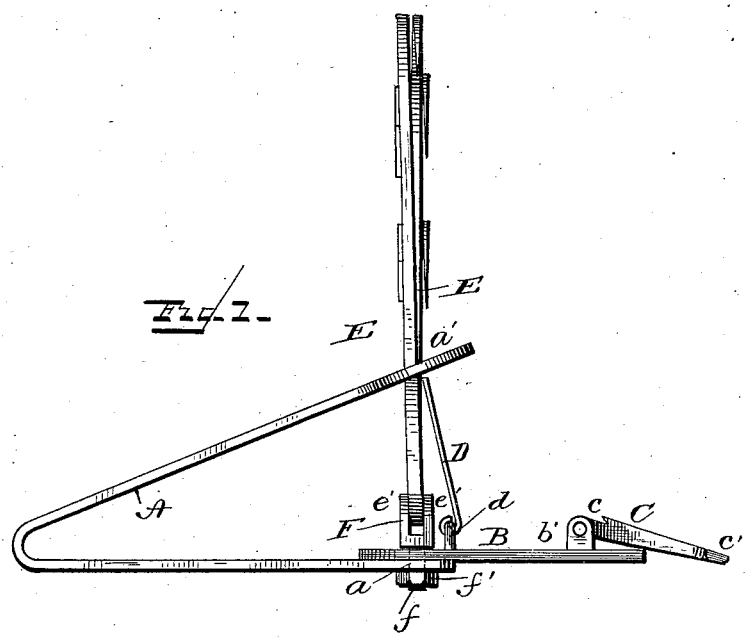
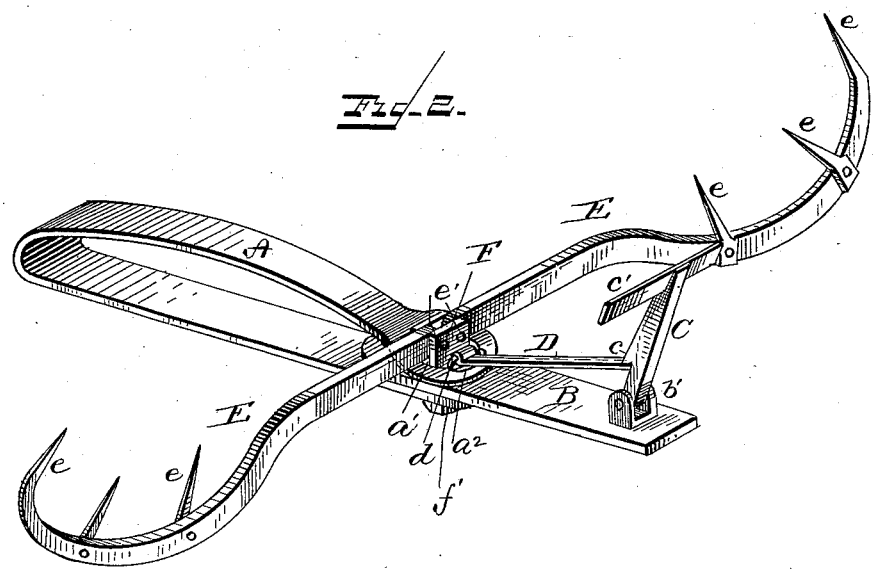
Witnesses
F. L. Durand
J. A. Moulder
Inventor
Abner M. Cleaver
By his Attorneys
Fitzgerald & Co

UNITED STATES PATENT OFFICE.

ABNER MITCHEL CLEAVER, OF PETTY, ARKANSAS.

ANIMAL-TRAP.

SPECIFICATION forming part of Letters Patent No. 376,142, dated January 10, 1888.

Application filed October 29, 1887. Serial No. 253,737. (No model.)

*To all whom it may concern:*

Be it known that I, ABNER MITCHEL CLEAVER, a citizen of the United States, residing at Petty, in the county of Sevier and State of Arkansas, have invented certain new and useful Improvements in Animal-Traps; and I do hereby declare the following to be a full, clear, and exact description of the invention, such as will enable others skilled in the art to which it appertains to make and use the same.

My invention relates to traps for catching the beaver, otter, and other similar animals; and the object of my invention is to produce a trap which shall securely grip the animal about the body, and thus prevent any possibility of its escape.

It is well known that such animals as the beaver, otter, and the like, if caught only by a foot or limb, will gnaw off the member, and thus effect their escape, and for this reason only a small proportion of trapped animals have been captured. The hereinafter-described invention avoids this difficulty, and at the same time prevents any damage to the pelt or fur of the animal.

The invention consists in the peculiar and novel features of construction and arrangement hereinafter described and claimed.

In order that my invention may be fully understood, I will proceed to describe it with reference to the accompanying drawings, in which—

Figure 1 is a side elevation of my improved trap as it appears when sprung. Fig. 2 is a perspective view of the same when set.

In the said drawings, A designates a stout V-shaped spring, the lower end of which is formed with a hole, $a$, and the upper end of which is formed with an opening, $a'$, having a forward extension, $a^2$, the latter being for a purpose to be hereinafter explained.

B designates an oblong rectangular metal plate, which I term the "pan-bar" or "plate," and which is formed at one end with a square or angular opening, $b$. At its opposite end the plate B is formed with two upwardly-extending lugs, $b'$, between which is pivoted the lower end of a trigger or trip, C. This trigger is formed on its lower part and at one side thereof with a notch or shoulder, $c$, and its upper end is formed with a T-head, $c'$, as shown.

D designates a pawl or catch, which is pivoted upon a metal loop, $d$, which is in turn secured to the plate B near its opening $b$, as shown.

E E designate two jaws, which are of substantially the form shown, and the upper portions of which are armed with strong slender spines or spikes $e$, which extend inward and downward when the jaws are in vertical position. The lower ends of these jaws are pivoted at $e'$ $e'$ to a metal connecting-piece, F, which is provided at its under side with a screw-threaded stem, $f$, to receive a securing-nut, $f'$.

The above-described parts are secured together substantially as shown in the drawings—that is to say, the plate B is placed upon the lower end of the spring A, with its opening $b$ in line with the hole $a$ of the spring. The jaws E are inserted through the opening $a'$ in the upper end of spring A, and the stem $f$ is inserted through the opening $b$ and hole $a$ and is secured by the nut $f'$.

Now, in order to set the trap, the upper end of the spring A is pressed down as far as possible toward the lower end, the catch or pawl D being passed through the extension $a^2$. The trigger C is now raised, and the outer end of the catch is engaged beneath the shoulder $c$ of the trigger. The trap is tethered by a chain connected to the bend of the spring A, near to or at the exit or door of the animal's hut, the portion B being away from the door. A suitable bait may be secured to the trigger, if desired.

It will be seen that as the animal emerges from its hut it will strike the trigger C with its breast, and that when it does so its body will be between the jaws E, which, as they fly up, will grip it in the sides, thus holding it securely against escape. At the same time the spines or spikes, owing to their slender form, will not damage the pelt or skin of the animal.

It is evident that other animals than those mentioned may be securely trapped with this device, and also that various modifications— mere details of construction—may be adopted without departing from the essential spirit of my invention.

Having thus described my invention, what I claim as new therein, and desire to secure by Letters Patent, is—

In an animal-trap, the combination of the spring A, constructed as described, the plate B, carrying the notched and shouldered trigger C, the pawl D, pivoted to said plate and adjacent to the free end of the spring, through which it passes, and the jaws E, connected to bearings of said plate, as shown and described.

In testimony whereof I affix my signature in presence of two witnesses.

ABNER MITCHEL CLEAVER.

Witnesses:
JAMES S. STEEL,
T. B. HUTCHESON.